United States Patent [19]

Lamar

[11] Patent Number: 5,169,078
[45] Date of Patent: Dec. 8, 1992

[54] RUBBER TIRE SHREDDER

[76] Inventor: Clyde Lamar, 2956 Carmel Ct., West Sacramento, Calif. 95691

[21] Appl. No.: 723,751

[22] Filed: Jul. 1, 1991

Related U.S. Application Data

[63] Continuation-in-part of Ser. No. 496,286, Mar. 20, 1990, Pat. No. 5,074,479.

[51] Int. Cl.$^5$ ............................................. B02C 18/18
[52] U.S. Cl. .................................. 241/222; 241/166; 241/236; 241/DIG. 31
[58] Field of Search ............... 241/166, 167, 235, 236, 241/196.1, 101.7, DIG. 31, 243, 222

[56] References Cited

U.S. PATENT DOCUMENTS

| | | | |
|---|---|---|---|
| 3,682,396 | 8/1972 | Whitney | 241/166 X |
| 3,931,935 | 1/1976 | Holman | 241/167 X |
| 4,374,573 | 2/1983 | Rouse et al. | 241/DIG. 31 X |
| 4,607,800 | 8/1986 | Barclay | 241/DIG. 31 X |
| 4,684,071 | 8/1987 | Dicky | 241/DIG. 31 X |
| 4,752,038 | 6/1988 | Takahashi et al. | 241/167 X |
| 4,923,126 | 5/1990 | Lodovico et al. | 241/166 X |

Primary Examiner—Timothy V. Eley
Attorney, Agent, or Firm—William S. Bernheim

[57] ABSTRACT

A tire shredder having a stripper plate to prevent feed from wrapping about a shaft on which feeder discs are mounted.

1 Claim, 4 Drawing Sheets

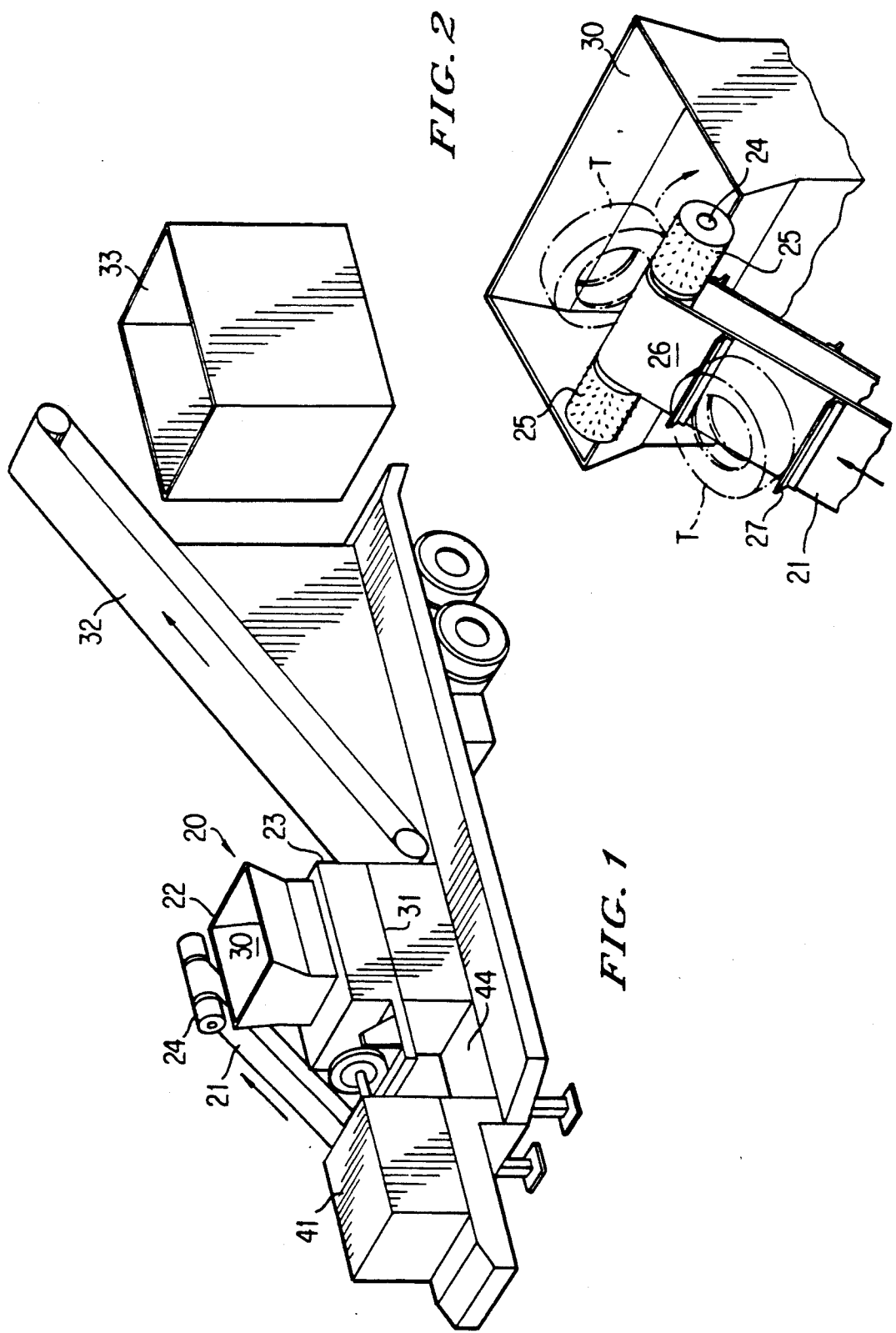

/ 1

RUBBER TIRE SHREDDER

RELATED U.S. APPLICATION DATA

This application is a continuation-in-part of my application Ser. No. 07/496,286 filed Mar. 20, 1990 now U.S. Pat. No. 5074479, which was subject to an election requirement.

BACKGROUND OF THE INVENTION

1. Field of the Invention

The present invention relates to shredding discarded rubber vehicle tires.

2. Description of the Prior Art

Millions of pneumatic vehicle tire casings are discarded daily in the United States. Disposal and recycling efforts have problems. Buried tires are an unstable fill because the tires tend to resurface as a result of air pockets and the density of the rubber. Air pollution problems are created if casings are burned, especially if the casings are not shredded to promote faster combustion.

There are tire shredding machines, but these have generally been uneconomic. The shredders suffer from low output, high water requirements, frequent jamming, rapid dulling of cutter blades and breakdowns.

Shredders have been built with a vertical passage leading to a pair of transversely disposed cutter wheels on adjacent parallel shafts rotating at different speeds. The cutter wheels have flat side walls that partially overlap, so that rotation results in a scissors action reducing the rubber tires into manageable and disposable or burnable shreds.

Water has frequently used as a lubricant with the shredders by freely spraying water into the cutting chamber. The casings are wetted by freely spraying water into the cutting chamber. Heretofore the amounts of water have required an immediate source and a means of disposing of somewhat polluted water. The area around the shredders easily become swamplike.

STATEMENT OF THE OBJECTS

Accordingly, it is an objective of the present invention to increase output, reduce jamming, increase cutting blade life and reduce breakdowns to produce a practical tire shredder.

Other objectives, advantages and novel features of the invention will become apparent to those skilled in the art upon examination of the invention and the accompanying drawings.

SUMMARY OF THE INVENTION

Brief Description of the Drawings

Further objectives and advantages of the invention will be apparent from the following detailed description, taken in conjunction with the accompanying drawings illustrating a preferred embodiment of the invention. The drawings are:

FIG. 1 is a prospective view of a stick type figure of the overall configuration of a shredder in accordance with the invention.

FIG. 2 is an opposite prospective view of a portion of FIG. 1 to show a portion of the initial conveyor.

DETAILED DESCRIPTION OF A PREFERRED EMBODIMENT

Figure 4:
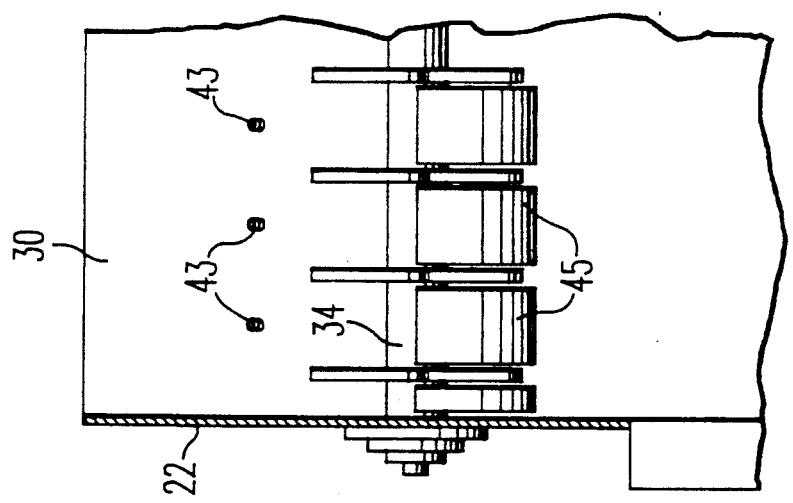
FIG. 4 is a side view of the upper section of the cutting chamber in accordance with the invention.

FIG. 1 schematically shows a shredder apparatus 20 for shredding rubber tires in accordance with this invention. Tire casings T are placed on a first conveyor 21 to be delivered to the hopper 22 which sits atop a cutting chamber 23.

The first conveyor 21 as shown in more detail in FIG. 2 has a roller 24 adjacent the hopper 22 at the high end of the first conveyor 21. The conveyer 21 is from 60 cm to 80 cm in width and the roller 24 as better seen in FIG. 2 is modified to have a wheel 25 mounted outward of each edge of first conveyor 21 on the roller 24. Each wheel 25 has a width of about 30 cm. The diameter of the wheels 25 is such that the surface of the wheel 25 is a side extension of the conveyor surface. The wheels 25 rotate with the roller 24 so the surface of the wheels 25 is moving at the same speed as the first conveyor 21. The surface of the wheels 25 is studded with small nail like projections of about 1.5 cm for better traction when in contact with the casings T. The wheels 25 reduce the number of casings T falling from the first conveyor 21 and missing the hopper 22 and also reduces the variation of angles with which casings T are fed into the hopper 22.

The first conveyor 21 includes a belt or diameter belt 26 to which angle irons 27 are attached at regular intervals of about 60 cms and perpendicular to the path of the conveyor to form projections 27. The projections 27 have a width of about 40 cms and project about 4 cms from the belt surface of the first conveyor 21. The projections 26 prevent casings T from sliding down the first conveyor 21. The casings T can be hooked on a projection 27 or the outside of the casing T rested against a projection 27. As modified, the first conveyor 21 can use a much steeper angle of incline than earlier conveyors provided for the same purpose. The use of a steeper angle allows the shredder to operate in more confined spaces.

The entrance 30 of the hopper 22 is disposed off the ground a sufficient distance so that gravity assists the casings T to fall into hopper 22 which sits atop the cutting chamber 23 and assists the shredded scraps S to fall from an exit 31 of the cutting chamber 23. From the exit 31 the scraps S fall to a second conveyor 32 for removal to a bin 33 or other collection means for hauling to a suitable disposal or use site.

The shredding is accomplished in the cutting chamber 23. In the shredding process the tire casings are reduced to small shreds S. The shreds S vary in size, the major dimension being typically less than 5 cms. Smaller shreds and more uniform sizing can be achieved by recycling a portion of the output back to the cutting chamber 23 or positioning a second cutting chamber to receive the output of the first chamber 23. Recycling reduces processing capacity and multiple chambers adds cost.

Preferably, the apparatus 20 is sized to be mountable on a truck trailer to provide mobility. The apparatus 20 is moved to accumulations of casings rather than casings moved to the apparatus 20. An immobile shredder is uneconomical.

Figure 3:
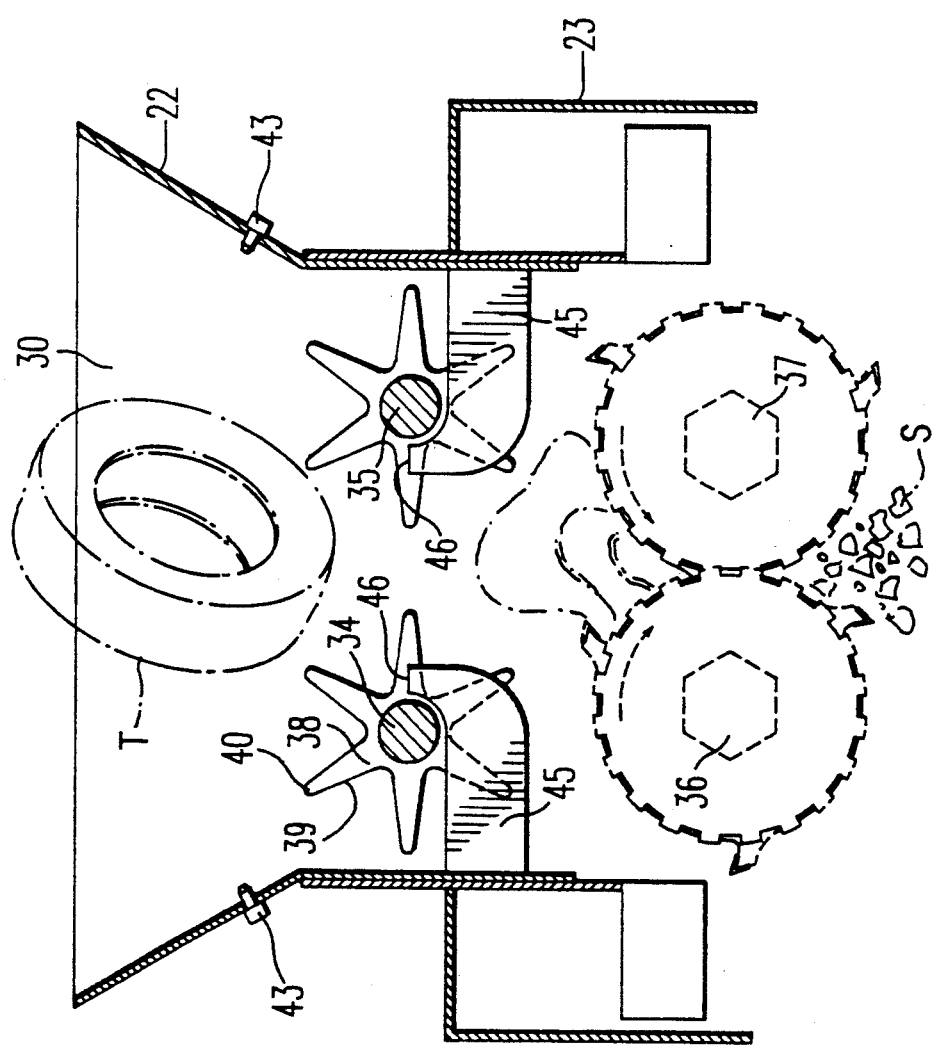
FIG. 3 is an end view of the cutting chamber in accordance with the invention.

Looking downward the cutting chamber 23 is about a 1.5 meters wide and about 1.0 meter in length. FIG. 3 is a side view of the hopper 22 and chamber 23. At the entrance to the chamber 23 in the lower portion of the hopper is a pair of parallel feed shafts 34 and 35. In the chamber 23 adjacent and below the paired feed shafts 34 and 35 is a pair of parallel cutter shafts 36 and 37.

Mounted on each feed shaft 34 and 35 at intervals are star shaped discs 38; the points or fingers 39, preferably 6, of the discs 38 are blunted at the tips 40 and spaced to engage the casings loosely and pull the casings T downward when the shaft 34 on the left is rotated clockwise and the shaft 35 on the right is rotated counter clockwise. Gravity and the downward motion imparted to the casings T move the casings into the path of the cutter shafts 36 and 37.

The rotational speed of the feed shafts 34 and 35 are equal. The rotational speed of feed shafts 34 and 35 are also set relative to the rotational speed of the cutter shafts 36 and 37. Preferably, these shafts are all driven with a single engine or power means 41 and driven with gearing means to adjust the various speeds of rotation. There is an rpm difference between one cutter shaft and the other cutter shaft of from 12 to 20 rpm. The feed shafts 34 and 35 rotate at the same speed and at the same rpm as the slower of the cutter shafts. Preferably the engine for the shredder apparatus has a transmission so that the rpm of the slower cutter shaft can be slowed to increase torque. Preferably 6 to 8 rpm is used for truck tires and 45 to 60 rpm is used for passenger cars.

The hopper 22 has spray nozzles 43 mounted at spaced intervals about its periphery just above the level of the feed shafts 34 and 35. The nozzles 43 are positioned to deliver a mist to the interior of the hopper 22. Six nozzles 43 spaced evenly along each side should be sufficient. In operation, approximately 65 gallons per hour are used. Passing the water through a 10 micron screen prior to feeding the water to the nozzles reduces clogging of the nozzles and allows smaller nozzle openings and hence less water to be needed. The apparatus 20 is equipped with a 1000 gallon water tank 44 which should be sufficient for a day's operation.

The discs 38 mounted on the feeder shafts 34 and 35 have an outside diameter of about 20 cm. The interval between discs 38 is about 15 cm, center to center. Typically the star shaped discs 38 have six fingers 39 to the star and each finger extends 7.5 cm inward from the tip 40. The tip 40 is blunted. The width of the star is 1.25 cm and the center 38 is hollow and shaped for mounting on the shafts 34 or 35. As shown the center is cylindrical could be hexagonal or other shape. The discs 38 are fixedly mounted to the shafts 34 and 35 to rotate with them.

The shafts 34 and 35 are mounted spaced apart to have the tips 40 on the opposing shafts no closer than 10 cm widthwise. The discs 38 on each shaft are mounted not opposite a disc 38 on the other shaft but spaced evenly between two adjacent discs 38 on the other shaft so that the discs 38 alternate from shaft to shaft and intermesh with wide spacing.

Past shredders have had feed type shafts but they have jammed frequently. The fingers 39 tend to bring casings not only downward but on around up against the outside walls of the cutting chamber 23 to jam. Mounted to the walls of the cutting chamber 23 to prevent jamming are stripper plates 45 between each pair of discs 38. Each plate 45 extends the width between adjacent discs 38 about 13 cm. Clearance between the sides of the plate 45 and disc 38 is not critical and is about 1 cm. The plate 45 extends inward from the chamber wall and below the adjacent feed shaft and inward of the feed shaft to have a surface 46 parallel to the level of the center lines of the shafts 34 and 35. The surface is about 2.5 cm by 13 cm. Clearance between plates 45 and the adjacent feed shaft is not critical and is about 1 cm.

Figure 5:
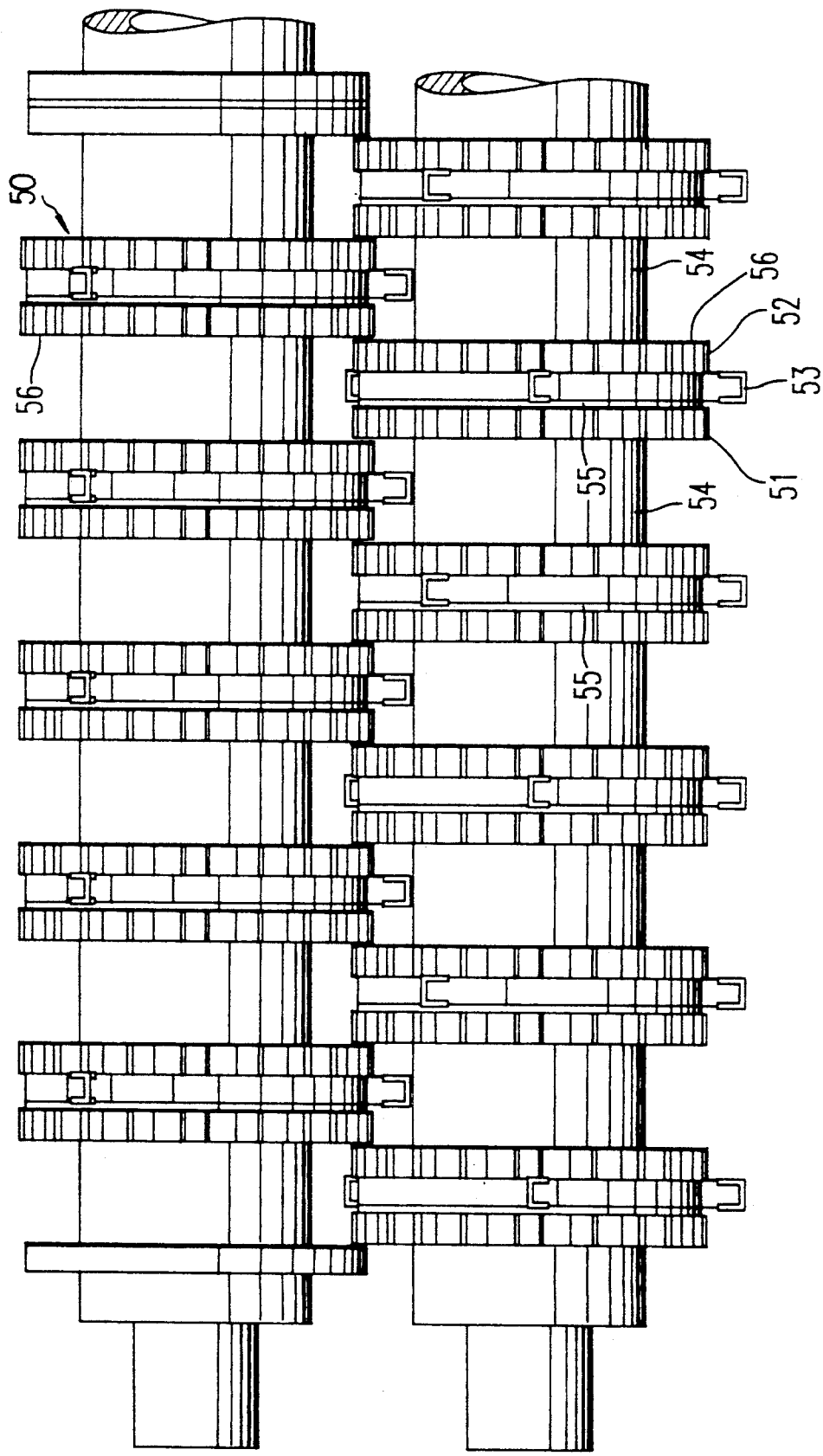
FIG. 5 is a top view of a cutter blade assembly in accordance with the invention.

Mounted on each cutter shaft 36 and 37 as shown in FIG. 5 at precise intervals are a series of cutter bundles 50 comprising two slitter blades 51 and 52 sandwiching a grabber disk 53. The interaction of cutter bundles 50 combine to shear and slice the casings to achieve the shredding.

The bundles 50 as mounted are interspaced with the bundles 50 on the other shaft so they alternate and interlock. The precise interval is crucial being 0.005 to 0.010 cm wider than the width of the opposing interspaced bundle 50. The interval is maintained by mounting first spacer disks 54 on the cutter shafts between the bundles 50. The width of the cutter bundles 50 is also crucial and must be maintained within a 0.0012 cm tolerance. In addition the radius of the first spacer 54 is important as it controls the size of the shreds moving downward past the shafts and out of the apparatus 20. The outside radius of the first spacer 54 and outside radius of the bundle 50 and space between adjacent bundles on the same shaft is the area through which the shreds must pass.

In use as described in more detail later, the slitter blades 51 and 52 are sharpened by milling the side which reduces the thickness of the slitter blade. The blades 51 and 52 are designed for four to six sharpenings either on one side or some on each side. After each sharpening, to maintain the critical bundle 50 thickness a second spacer 55 is added between one slitter blade and its adjacent grabber disk 53. The thickness of the second spacer 55 replaces the thickness removed by the milling of the slitter blades of the bundle 50. A thicker second spacer 55 is needed after each sharpening.

Figure 7:
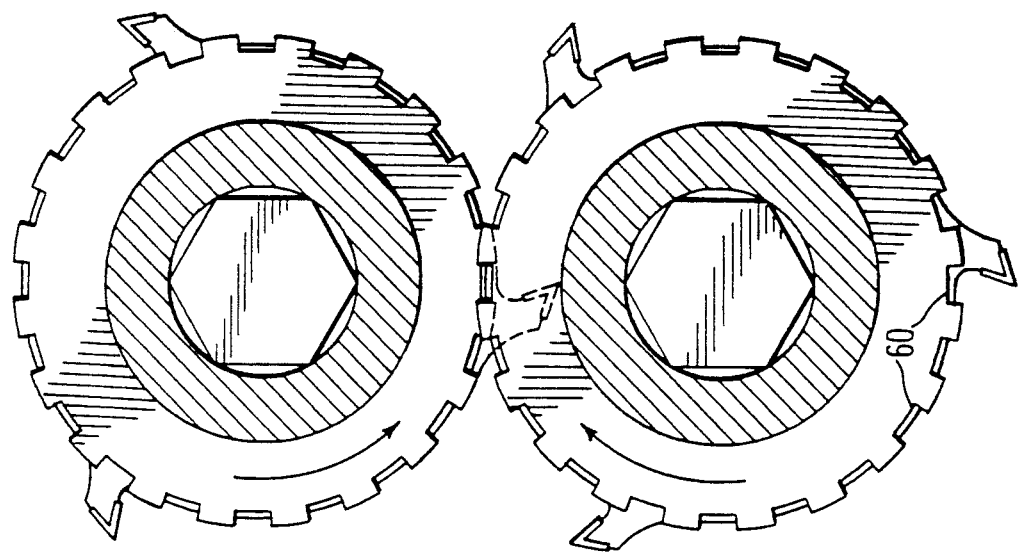
Figure 6:
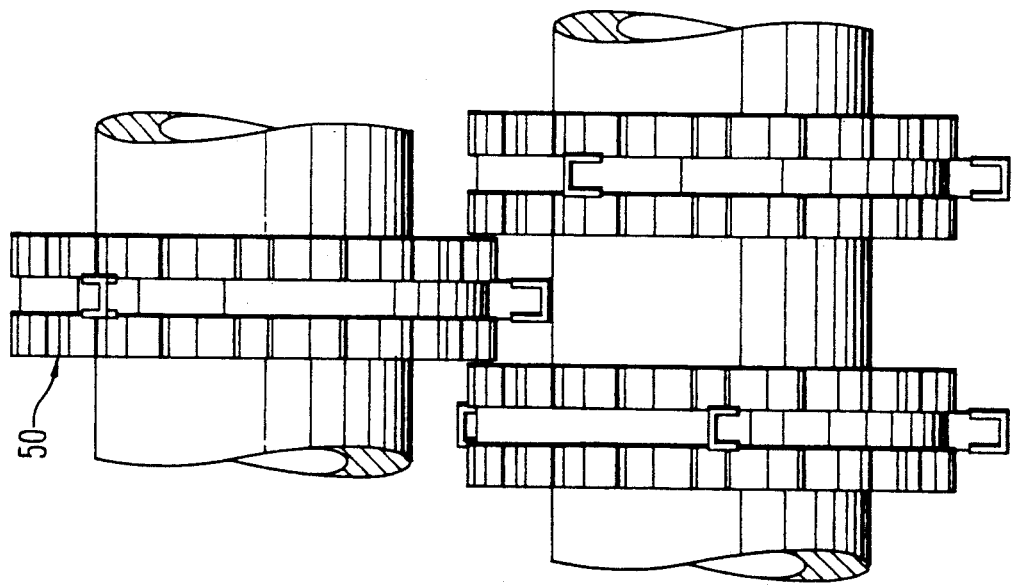

The slitter blades 51 and 52 are made of high quality steel. The outside radius is about 7 cm plus or minus 0.05 mm. The initial thickness is 2 cm plus or minus 0.05 mm. The blades are circular as seen in FIGS. 6 and 7 with cutouts 60 at 2 cm intervals of 0.5 cm depth and 2 cm length.

A shearing action is achieved by the series of rotating cutter bundles 50 mounted on the shafts alternating to interlock so that their side faces 56 lie close together and act like scissors as the shafts 36 and 37 are rotated. The following side of the cutout 60 and outside surface of the adjacent slitter blade act like continuously rotating scissor blades.

Wear occurs primarily on the following side of the cutout 60 on the slitter blades 51 and 52 occurs adjacent the distal side face of blade. Dullness reduces the efficiency and a number of actions are available to renew the effectiveness of the blade. One is to switch the place of slitter blades of a bundle 50 relative to the grabber disk 53. This uses the same following side for the scissor action but adjacent the opposite side face of the blade.

Similarly the slitter blade can be reversed in place or interchanged with a slitter blade on the opposite shaft. This switches the leading side for the following side of the cutout 60. These procedures significantly increase slitter blade life.

The slitter blades are resharpened by milling off the side face of the slitter blade approximately 3 mm. The loss in thickness of the slitter is accounted for by adding a second spacer 55 or adjusting the thickness thereof.

The grabber 53 is a circular disk having projecting teeth. A second material 61 is mounted on the teeth to absorb the wear. A purpose of the teeth is to assist the movement of the carcasses down between the cutter shafts 36 and 37.

I claim:
1. A tire casing shredder including in combination:
   a. a chamber having a vertical passage therethrough,
   b. a pair of horizontally mounted parallel feed shafts supported rotatably at the entrance to the chamber in the passage way,
   c. a series of feeder discs, being generally star-shaped to have multiple fingers and blunt tips, mounted on each feed shaft so that the discs alternate from shaft to shaft and intermesh with wide spacing,
   d. a stripper plate mounted to the wall of the cutting chamber to extend inward to and along one of the feed shafts in the space between two adjacent feeder discs and below the feed shaft and then upward and inward of the feed shaft to have a surface parallel to the level of the center line of the feed shaft.

* * * * *